(12) United States Patent
Kang

(10) Patent No.: US 7,440,020 B2
(45) Date of Patent: Oct. 21, 2008

(54) APPARATUS FOR RECORDING THREE DIMENSIONAL VIDEO AND MOVIE CAMERA

(76) Inventor: Seung-Yeon Kang, 102 2-dong, Miju-Apartment 16-1, Bampo 2-Dong, Seocho-gu, Seoul (KR) 137-800

( * ) Notice: Subject to any disclaimer, the term of this patent is extended or adjusted under 35 U.S.C. 154(b) by 1200 days.

(21) Appl. No.: 10/474,055

(22) PCT Filed: Apr. 13, 2002

(86) PCT No.: PCT/KR02/00680

§ 371 (c)(1),
(2), (4) Date: Oct. 6, 2003

(87) PCT Pub. No.: WO02/084378

PCT Pub. Date: Oct. 24, 2002

(65) Prior Publication Data

US 2004/0165062 A1  Aug. 26, 2004

(30) Foreign Application Priority Data

Apr. 14, 2001 (KR) ............................. 2001-20083

(51) Int. Cl.
*H04N 5/225* (2006.01)
(52) U.S. Cl. ..................................... 348/335
(58) Field of Classification Search ............. 348/335
See application file for complete search history.

(56) References Cited

U.S. PATENT DOCUMENTS

| 4,678,298 | A | * | 7/1987 | Perisic ............... 352/62 |
| 5,570,150 | A | | 10/1996 | Yoneyama et al. |
| 5,867,309 | A | * | 2/1999 | Spink et al. ......... 359/377 |
| 6,744,930 | B1 | * | 6/2004 | Perlin ............... 382/284 |

FOREIGN PATENT DOCUMENTS

| JP | 08-149518 | 6/1996 |
| JP | P2000-081331 A | 3/2000 |
| KR | 1993-0020212 A | 10/1993 |

OTHER PUBLICATIONS

International Search Report; PCT/KR02/00680; ISA/KR, Mailed: Jun. 25, 2002.

* cited by examiner

*Primary Examiner*—James M Hannett
(74) *Attorney, Agent, or Firm*—Harness, Dickey & Pierce, P.L.C.

(57) ABSTRACT

The present invention is related to an apparatus for recording three dimensional video, and a movie camera which intend to allow recording of images in stereoscopic 3-D with a normal movie camera. This apparatus makes it possible to record images in stereoscopic 3-D which have the same color and brightness of images recorded in stereoscopic 2-D.

10 Claims, 3 Drawing Sheets

APPARATUS FOR RECORDING THREE DIMENSIONAL VIDEO AND MOVIE CAMERA

TECHNICAL FIELD OF THE INVENTION

The present invention relates to an apparatus for recording three dimensional (hereinafter "3-D") video and movie camera, more particularly, to a 3-D video recording apparatus which allows rapid and continuous recording of images from a multiple of perspectives by letting incidence of images of an object from any direction so that 3-D perception of the object with human eyes alone is enabled, and movie camera (equipped with such apparatus).

BACKGROUND ART

The 3-D images captured by a conventional 3-D video recording device can only be perceived as three-dimensional when they are viewed through a 3-D eyewear, which is inconvenient for the users.

Recently, a device has been developed that allows 3-D video recording with a single video camera, which was possible in the conventional art in a clumsy way only through two special stereoscopic movie cameras. However, a problem with this device is its ghost effects that arise from colors of the polarizing plate as well as the liquid crystal (hereinafter, "LC"), insufficient transmission of the light, incomplete opening and closing of the LC shutter, etc. Furthermore, since such device reduces the amount of light incidence almost up to an half (50%) of the given light, due to its use of half-mirror as reflectors (50% light reflecting product), the images taken are too dark and of inferior quality containing serious noise even under a normal indoor light condition that would generally allow a satisfactory recording of images, in addition to the annoying obligatory use of a 3-D eyewear.

DETAILED DESCRIPTION OF THE INVENTION

The present invention, conceived in view of the foregoing, aims to provide a 3-D video recording apparatus which can easily be attached to/detached from a conventional movie camera without impeding any function of the movie camera and allows recording of 3-D images in the same brightness and color as in two dimensional video recording so that 3-D perception of the captured image with human eyes alone is enabled, and movie camera (equipped with such apparatus).

The present invention further aims to provide a 3-D video recording apparatus, which also provides images capable of being perceived as three dimensional through a 3-D eyewear, by controlling the rotating body of the above 3-D video recording apparatus (and of the movie camera equipped with such 3-D video recording apparatus).

In order to achieve the above objectives, the present invention provides a 3-D video recording apparatus, which is capable of recording 3-D images while attached to the body of a movie camera with an object lens, comprising a hollow rotating body; a driving means for rotating the above hollow rotating body; a first reflector, which is combined at one end of the above hollow rotating body in a predetermined angle to the axis of incidence of the light to make synchronized rotation with the above hollow rotating body, and reflects the light entering the above hollow rotating body; a second reflector, which is combined with (at another end of) the above hollow rotating body to make synchronized rotation with the above hollow rotating body, and reflects light reflected by the above first reflector so that the reflected light enters the above object lens; and a connecting part, which combines the above rotator driving means inclusive of the above hollow rotating body with the above object lens in an attachable/detachable manner.

Here, the above second reflector is installed parallel to, but distant from the above first reflector.

The above first and second reflectors can be combined with the above hollow rotating body through the connecting part, whereby convenience of the combining can be enhanced if the combining part is made in thread type.

The above rotating body driving means can adopt a rotating/reverse rotating motor.

The above first reflectors can also be constructed in a manner that the first reflector, which is to be fixed at the above rotating body driving means, takes a funnel form with gradually reduced diameters toward the object lens, while the second reflector is combined with the above hollow rotating body so as to make synchronized rotation with the above hollow rotating body.

The above reflectors are of a spherical form, and the above object lens may comprise a certain lens or prism in front of it for the control of the width of the light incidence.

The angle of the first and second reflectors to the axis of incidence of light as well as to the object lens can (preferably) be 45°.

The above objectives can also be achieved by a 3-D movie camera in accordance with the present invention, comprising a movie camera body inclusive of an object lens; a hollow rotating body; a driving means for rotating the above hollow rotating body; a first reflector, which is combined at one end of the above hollow rotating body in a predetermined angle to the axis of incidence of light to make synchronized rotation with the above hollow rotating body, and reflects light entering the above hollow rotating body; a second reflector, which is combined with at another end of the above hollow rotating body to make synchronized rotation with the above hollow rotating body, rotates together with the above first reflector while located parallel to, but distant from the first reflector so that it reflects the light reflected by the above first reflector in a way that the reflected light enters the above object lens; and a connecting part, which combines the above rotator driving means inclusive of the above hollow rotating body with the above object lens in an attachable/detachable manner.

The above reflectors are of a spherical form, and the above object lens may comprise a certain lens or prism in front of it for control of the amount of the light incidence.

The angle of the first and second reflectors to the axis of incidence of light as well as to the object lens can (preferably) be 45°.

PREFERRED EMBODIMENTS OF THE INVENTION

The preferred embodiments of the present invention are described below in detail, making reference to the accompanying drawings.

Figure 1:
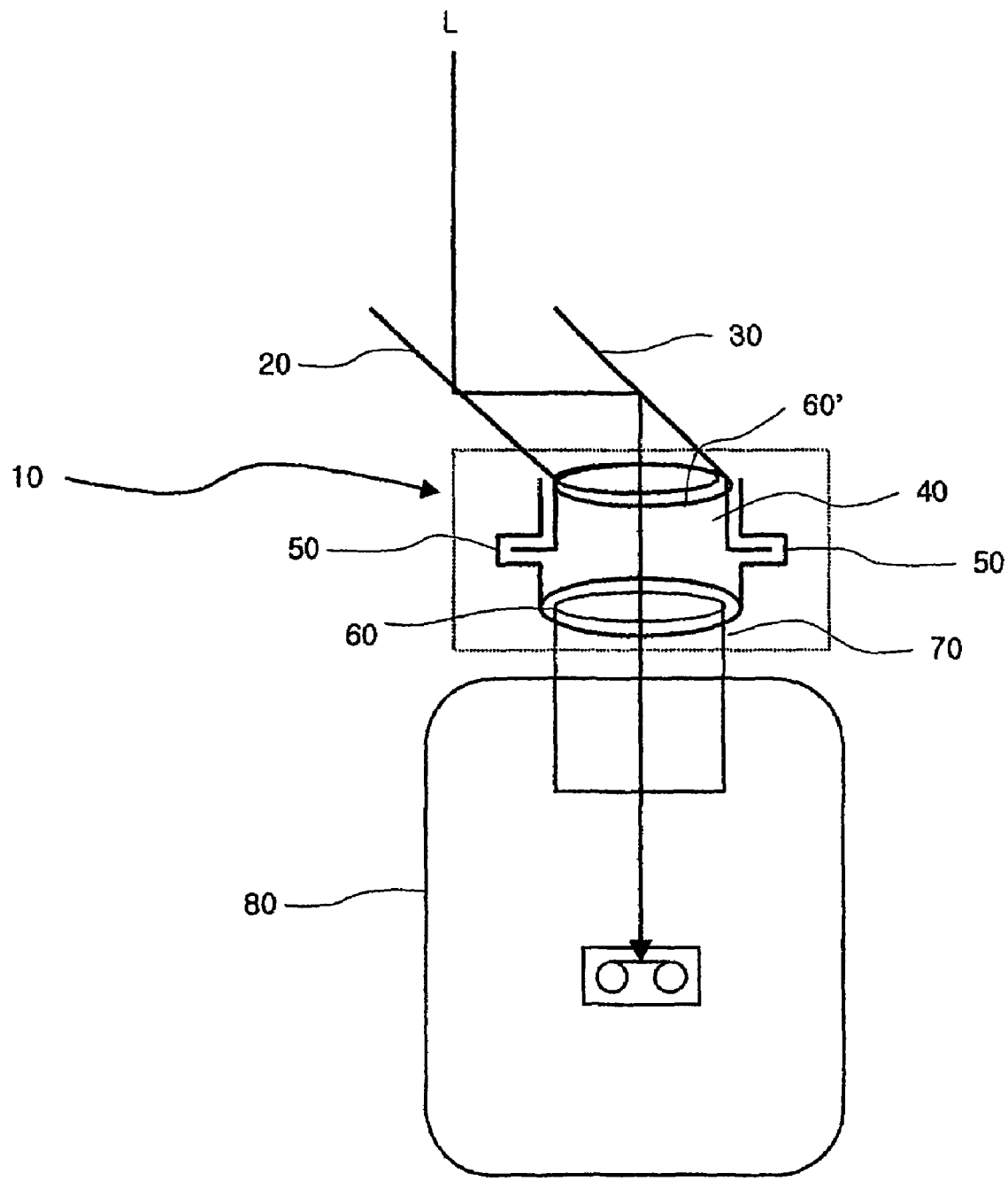
FIG. 1 illustrates a schematic construction showing a 3-D video recording apparatus in accordance with an embodiment of the present invention as combined with a movie camera.

As shown in FIG. 1, a 3-D video recording apparatus (10) in accordance with the present invention records 3-D images while it is combined with object lens (70) of a movie camera body (80). The 3-D video recording apparatus (10) comprises a first reflector (20) and a second reflector (30), which form the paths for incidence of light; a means for rotating a rotating body; and a hollow rotating body (40), which is installed rotably inside of the above rotating means and with which the above first and second reflectors (20, 30) are combined. A general motor (50) capable of rotating as well as reverse rotating and of controlling the stopping angle, can be adopted as a rotating means for the present embodiment.

Since the movie camera body (80) illustrated in the drawings represents a customary general movie camera, an explanation on the camera body (80) and the object lens (70) is omitted.

The first reflector (20) is combined with the hollow rotating body (40) at one end thereof in a predetermined angle, e.g. 45°, thereto. The first reflector (20) makes synchronized rotation with the hollow rotating body (40) when the latter (40) is made to rotate by the motor (50).

The second reflector (30), being installed opposite to the first reflector (20) and combined with the hollow rotating body (40), also makes synchronized rotation with the hollow rotating body (40). The second reflector (30) is installed parallel to the first reflector (20), tilted to the same angle, e.g. 45°, as that of the first reflector (20).

Accordingly, when the hollow rotating body (40) is made to rotate by the motor (50), the first and the second reflectors (20, 30) form paths of incidence of light (L) during they rotate, while maintaining parallel position to each other at any of the 360° directions. Namely, the light of incidence (L) is first reflected by the first reflector (20), and then reflected again by the second reflector (30), so that it enters the object lens (70) of the movie camera (body) (80). Here, inside of the hollow rotating body (40) with which the first as well as the second reflectors (20, 30) are combined, is formed hollow to allow the light (L) reflected by the first and the second reflectors (20, 30) to pass through it, and then to enter the object lens (70).

The motor (50) inclusive of the hollow rotating body (40) is selected in view of the construction, size, weight of the apparatus, as well as the desired rotation. The motor (50) is installed at the outer rim of the hollow rotating body (40) to enable rotation thereof (40). The rotation speed can be appropriately manipulated considering the speed of movements of the object and other circumstances.

Figure 2:
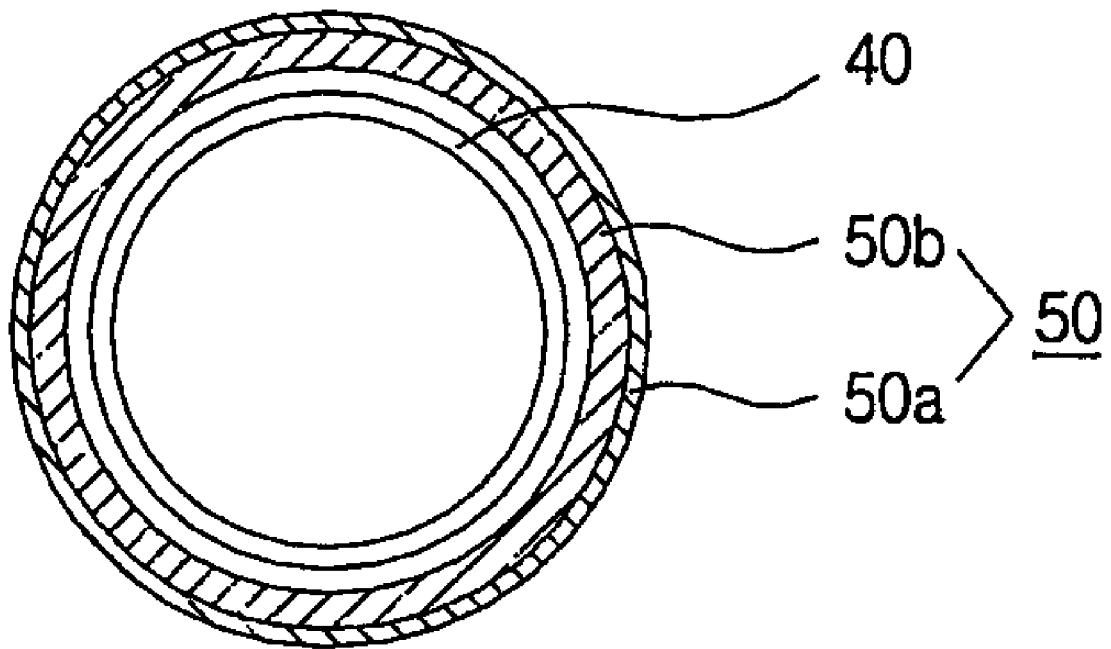
FIG. 2 is a simplified cross-sectional view of the motor part of the 3-D video recording apparatus in FIG. 1

FIG. 2 is a simplified cross-sectional view of the motor part of the 3-D video recording apparatus in FIG. 1. As shown in FIG. 2, the motor (50) comprises as a customary motor, a housing (50a) at outward side thereof and a coil (50b) in the housing (50a). In the inside of the coil (50b), a hollow rotating body (40) capable of interaction with the coil (50b) is provided for. Thus, the magnetic power generated by the current can rotate the hollow rotating body (40), when power is applied to the coil (50b). As mentioned above, FIG. 2 shows only a simplified cross-sectional view of the motor. The inner construction of the motor (50) can have that of a customary motor.

Figure 3:
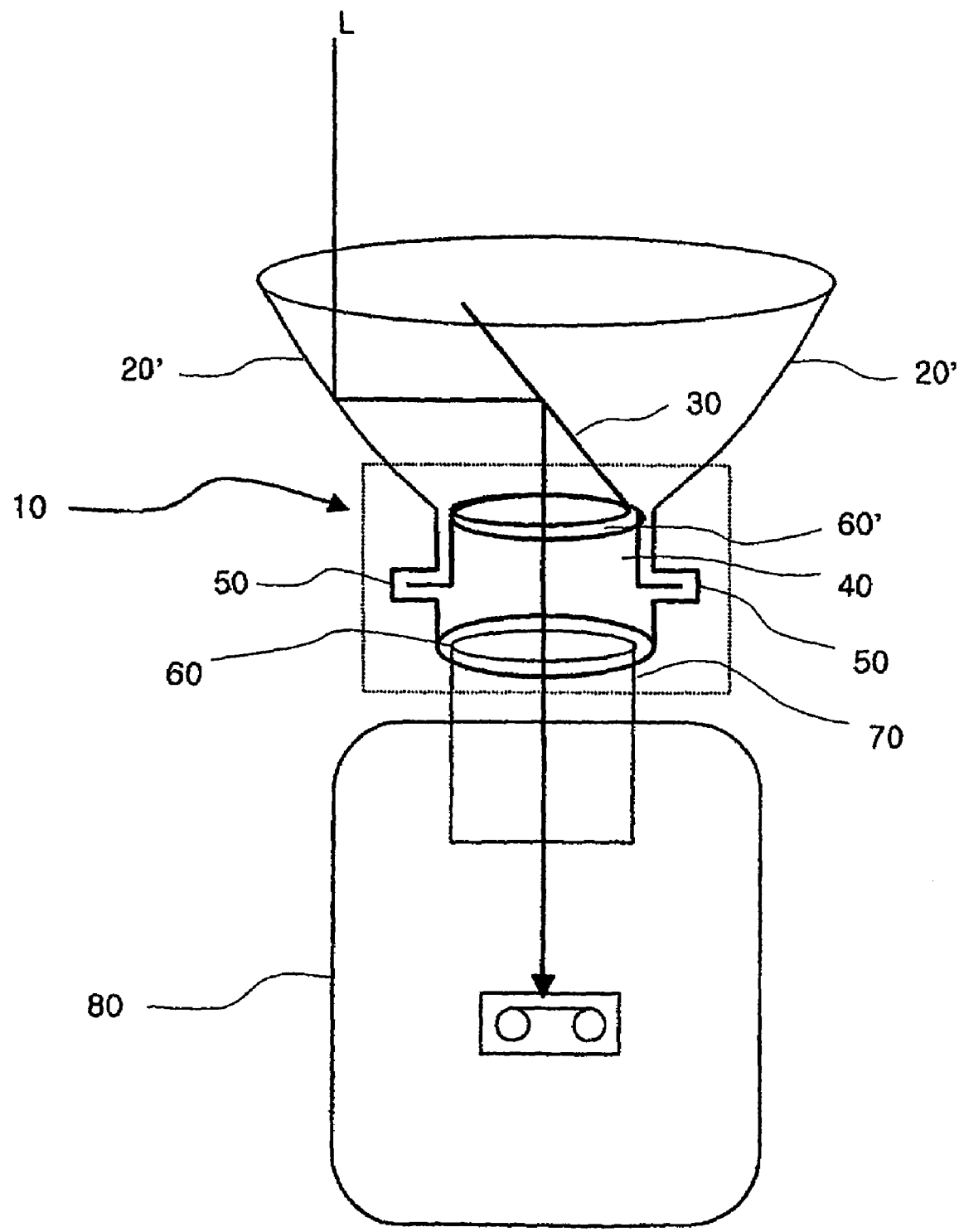
FIG. 3 illustrates a schematic construction showing a 3-D video recording apparatus in accordance with another embodiment of the present invention as combined with a movie camera.

As described above, the embodiment example in FIG. 1 adopts the first and the second reflectors (20, 30) in a manner that they are combined with the hollow rotating body (40) to make synchronized rotation with the hollow rotating body (40). In contrast thereto, the first reflector (20') in the embodiment example in FIG. 3 is either extended outward in funnel form from the cylinder form housing of the motor (50) or from a fixed end, along the cylinder, or fixed in an appropriate manner at the end of the housing (50a) of the motor (50).

In other words, the first reflector (20'), which is installed in a predetermined angle to the hollow rotating body (40) all around (360°) the outside of the hollow rotating body (40), takes a funnel form with gradually increasing diameter toward the direction of incidence of light, while only the second reflector (30) rotates as combined with the hollow rotating body (40). A construction like this can sufficiently achieve the above desired effects.

The above first reflector (20') can be manufactured either by coating light reflecting material on the inner side of the above extended part, or by making the extended part itself with light reflecting material.

In the above 3-D video recording apparatus, the first and the second reflectors (20, 30) are combined with the hollow rotating body (40) via the connecting part (60'). The motor (50) inclusive of the hollow rotating body (40) is combined with the object lens (70) of the movie camera (80) also via the connecting part (60).

Normally, object lens (70) of a movie camera (80) has a standardized inner diameter ranging between 25 mm and 52 mm, with a female screw formed inside of it. This standardized female screw allows combining of an ultra violet filter, a telescope lens, etc. with the object lens via a screw. Accordingly, a motor (50) inclusive of the hollow rotating body (40) can be combined with the object lens, by first combining the connecting part (60) with the screw of the object lens, and then, combining the motor (50) with the screw of the connecting part (60).

The first and the second reflectors (20, 30) are combined with the hollow rotating body (40) via the connecting part (60'). Here, the combination with the connecting part (60') can be made via a screw.

A description of operation of the 3-D video recording apparatus in accordance with the present invention is given below, which applies not only to a 3-D video recording apparatus (10), wherein the first reflector (20) as well as the second reflector (30) make synchronized rotation (see FIG. 1), but also equally to the 3-D video recording apparatus in FIG. 3, wherein only the second reflector (30) rotates.

Upon start of video recording, the motor (50) commences to rotate, which initiates rotation of the hollow rotating body (40) installed inside of the motor (50), and then, light (L) is directed into the object lens (70). However, only light (L) entering the light paths where the first reflector (20) and the second reflector (30) are located is allowed to enter the object lens after having been reflected by the first reflector (20) and the second reflector (30), and then recorded.

If the hollow rotating body (40) rotates, both the first reflector (20) directed forward, and the second reflector (30) directed to the object lens (70) make 360° rotation in the same direction as the hollow rotating body (40) of the motor (50), whereby making 3-D recording of picture of an object by recording images of the object continuously from divergent directions.

By rotation, sequential shootings from the multiple directions are taken repeatedly, divided into several frames per second based on speed of the rotation, whereby the continuous repetition images taken from a plurality of directions enable 3-D recognition of the object by human brain. Since countries, such as U.S.A., Korea, Japan adopt a standardized 30 frames per second, while the European countries adopt a standard of 25 frames per second, the present invention finds application to both of these systems. The Present invention may find application to every standard of any frames.

FIG. 1 exemplifies an embodiment of the present invention, wherein the first reflector (20) and the second reflector (30), both being parts distinct from the hollow rotating body (40), are combined with the hollow rotating body (40) to make synchronized rotation, in order to perform 3-D video recording from divergent directions, while FIG. 3 exemplifies another embodiment of the present invention, wherein the first reflector (20') is installed around the motor (50) inclusive of the hollow rotating body (40) and only the second reflector (30) is attached to the hollow rotating body (40) to make synchronized rotation therewith, and receives light (L) reflected by the first reflector (20'), which is installed to direct forward in every position, to reflect the light again, so that the second reflector (30) makes reflected light enter the object lens (70), to finally record 3-D images of an object.

By rapidly and continuously repeating the above operations, the 3-D video recording apparatus (10) allows repeated recording from multiple directions of images of an object, through making 360° rotation shooting of light (L) entering the object lens from the front. Such repeated images from multiple directions for same object form 3-D images in human brain.

Although the present invention has been described above in respect to the preferred embodiments, it is not restricted thereto, but rather the scope of rights of the present invention shall be determined by the appended claims allowing modifications, changes, adaptations, etc., as persons skilled in the art will understand.

For example, the angle to the object and focusing of the object can both be controlled by adjusting angel of the first reflector (20). Further, if a wide angled image is reflected to the object lens (70) using a spherical first reflector (not shown) or a spherical second reflector (not shown), and this wide angled image enters the object lens (70) through a magnifying lens or a prism installed in front of the object lens (70), width of the entering light from the reflectors to the object lens (70) can be narrowed in spite of the wide image angle, so that effective cut-off of the light directly entering the object lens (70) and widening of the image angle with small spherical reflector is enabled.

In other words, spherical reflectors can widen the image angle, while the magnifying lens or prism installed directly in front of the object lens (70) can narrow width of the light. In addition, a concave lens placed in front of the reflector can also be used in place of the spherical reflector.

Furthermore, recording of 3-D images, which can be viewed through a 3-D eyewear, is also possible by properly adjusting the rotating speed of the hollow rotating body (40), i.e. if the rotation speed of the hollow rotating body (40) is so controlled that it complies with the opening/closing speed of the left/right shutters of the 3-D eyewear, to the effect that the left/right images are taken to coincide with the switching of the left/right shutters of the 3-D eyewear, then recording of 3-D images (with a 3-D video recording apparatus in accordance with the present invention) that can be viewed by a 3-D eyewear is also possible.

The above description explains embodiments of the present invention, wherein the 3-D video recording apparatus (10) is manufactured separately from the movie camera (80), and then combined to the movie camera (80) to record 3-D images. Thus, the manufacturer produces only the 3-D video recording apparatus, so that this apparatus is subsequently combined with a customary movie camera body (80).

However, a 3-D video recording camera (not shown in the main figures of the drawings) comprising a 3-D video recording apparatus as per the present invention in an integrated manner can also fall within the scope of the present invention, which 3-D video recording camera represents a combination of a movie camera body (80) with any one of 3-D video recording apparatus (10) as per the present invention as exemplified in FIG. 1 and FIG. 3. The above explanation of the apparatus for recording 3-D video is helpful for the 3-D video recording camera. Thus a further explanation of the movie camera is omitted.

INDUSTRIAL APPLICABILITY

As described above, a 3-D video recording apparatus in accordance with the present invention not only allows recording of 3-D images that can be viewed three dimensionally without a 3-D eyewear, but also allows recording of 3-D images in brightness and color not inferior to those in a two-dimensional recording of images under the same light condition.

Further, the present invention can resolve fundamentally the problems of flickering and ghost effects that are frequently found in conventional 3-D video recording.

Since the attachable/detachable 3-D video recording apparatus as per the present invention can easily be attached to/detached from a two-dimensional movie camera currently in general use, it allows 3-D video recording of an object not negatively affecting the functions of a conventional movie camera.

In addition, the present invention can also provide 3-D images that can be perceived three-dimensionally via a 3-D eyewear, by controlling the rotation speed of the hollow rotating body in a manner that it coincides with the switching of the left/right shutters of the 3-D eyewear.

What is claimed is:

1. A three-dimensional (hereinafter, "3-D") video recording apparatus providing 3-D moving images of an object, wherein the 3-D moving images are obtained without interruption in video, by continuously recording images from a multiple of perspectives viewed from all directions (360°), instead of two-dimensional perspectives, while being combined to a basic recording body having an object lens; and the 3-D moving images can be perceived by two or only one naked eye without helping of 3-D eyewear or special device, by being normally played on conventional TV, monitor or screen which is not equipped with any special devices for playing such 3-D video, and comprising:

a hollow rotating body;

a driving means for rotating said hollow rotating body, wherein said hollow rotating body is rotatably installed within said driving means;

a first reflector, wherein said first reflector makes synchronized rotation with said hollow rotating body, wherein said first reflector is combined with said hollow rotating body at one end of said hollow rotating body in a predetermined angle to an axis of incidence of light from the object, and reflects the light to enter said hollow rotating body;

a second reflector located parallel to and distant from said first reflector, wherein said second reflector makes synchronized rotation with said hollow rotating body and said first reflector, wherein said second reflector is combined with said hollow rotating body at another end of said hollow rotating body, and receives and reflects said reflected light from said first reflector so that said reflected light enters the object lens after passing through said hollow rotating body; and a connecting part, which combines said driving means with said object lens in at least one of an attachable manner and a detachable manner.

2. The 3-D video recording apparatus as set forth in claim 1, comprising additionally a connecting part for combining said first reflector as well as said second reflector with said hollow rotating body.

3. The 3-D video recording apparatus as set forth in claim 1, wherein said driving means for rotating said hollow rotating body is a motor capable of rotation and reverse rotating.

4. The 3-D video recording apparatus as set forth in claim 1, wherein said reflector is of spherical form, and said object lens can accommodate a predetermined lens or prism in front thereof for controlling the width of incidence of the light.

5. The 3-D video recording apparatus as set forth in claim 1, wherein the angle of said first reflector and said second reflector to the axis of incidence of the light as well as to said object lens is 45°.

6. The 3-D video recording apparatus as set forth in claim 1, wherein said first reflector and said second reflector continuously reflect light to a recording device through said hollow rotating body.

7. The 3-D video recording apparatus providing 3-D moving images, wherein the 3-D moving images are obtained without interruption in video, by continuously recording images from a multiple of perspectives viewed from all directions (360°), instead of two-dimensional perspectives, while being combined to a basic recording body having an object lens; and the 3-D moving images can be perceived by two or only one naked eye without helping of 3-D eyewear or special device, by being normally played on conventional TV, monitor or screen which is not equipped with any special devices for playing such 3-D video, and comprising:

a hollow rotating body;

a driving means for rotating said hollow rotating body;

a first reflector fixed to the casing of said rotating body and has a funnel form with gradually reduced diameters toward said object lens;

a second reflector, which makes synchronized rotation with said hollow rotating body, while said second reflector is combined with said hollow rotating body at one end, receives said reflected light from said first reflector, and reflects the same again so that said reflected light enters the object lens after passing through said hollow rotating body, while said second reflector is located parallel to, and distant from the inner wall of said funnel form first reflector; and a connecting part, which combines said rotating body driving means inclusive of said hollow rotating body with said object lens in an attachable/detachable manner; and wherein said hollow rotating body is rotatably installed within said driving means.

8. A 3-D movie camera providing 3-D moving images of an object, wherein the 3-D moving images are obtained without video interruption by sequentially and continuously recording images from a multiple of perspectives viewed from all directions (360°), instead of two-dimensional perspectives; and the 3-D moving images can be perceived by two or only one naked eye without helping of 3-D eyewear or special device, by being normally played on conventional TV, monitor or screen which is not quipped with any special devices for playing such 3-D video, and comprising:

a movie camera body inclusive of an object lens;

a hollow rotating body;

a driving means for rotating said hollow rotating body, wherein said hollow rotating body is rotatably installed within said driving means;

a first reflector, wherein said first reflector makes synchronized rotation with said hollow rotating body, wherein said first reflector is combined with said hollow rotating body at one end of said hollow rotating body in a predetermined angle to an axis of incidence of light from the object, and reflects the light to enter said hollow rotating body;

a second reflector, wherein said second reflector makes synchronized rotation with said hollow rotating body and said first reflector, wherein said second reflector is combined with said hollow rotating body at another end of said hollow rotating body, and receives and reflects said reflected light from said first reflector so that said reflected light enters the object lens after passing through said hollow-rotating body, while said second reflector is located parallel to, but distant from said first reflector; and a connecting part, which combines said means with said object lens in at least one of an attachable manner and a detachable manner.

9. The 3-D movie camera as set forth in claim 8, wherein said reflector is of spherical form, and said object lens can accommodate a predetermined lens or prism in front thereof for controlling the width of incidence of the light.

10. The 3-D movie camera as set forth in claim 8, wherein the angle of said first reflector and said second reflector to the axis of incidence of the light as well as to said object lens is 45°.

* * * * *